May 26, 1936. F. X. LAUTERBUR ET AL 2,042,178
WATER SOFTENER REGENERATING PROCESS AND APPARATUS
Filed Aug. 18, 1932 5 Sheets-Sheet 1

INVENTOR.
Frank X. Lauterbur
Edward J. Lauterbur
BY
ATTORNEYS.

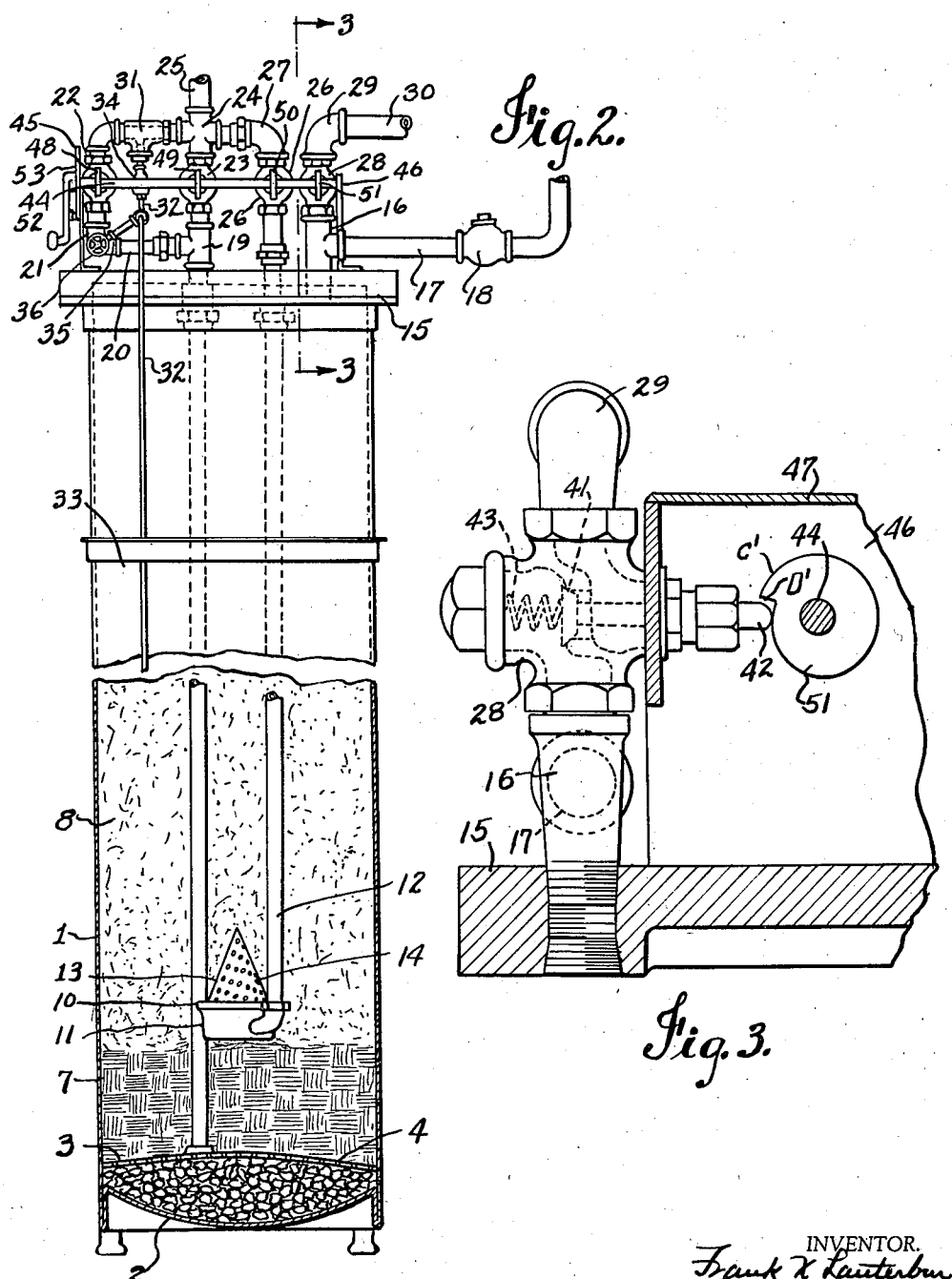

INVENTOR.
Frank X Lauterbur
Edward J Lauterbur
BY
ATTORNEYS.

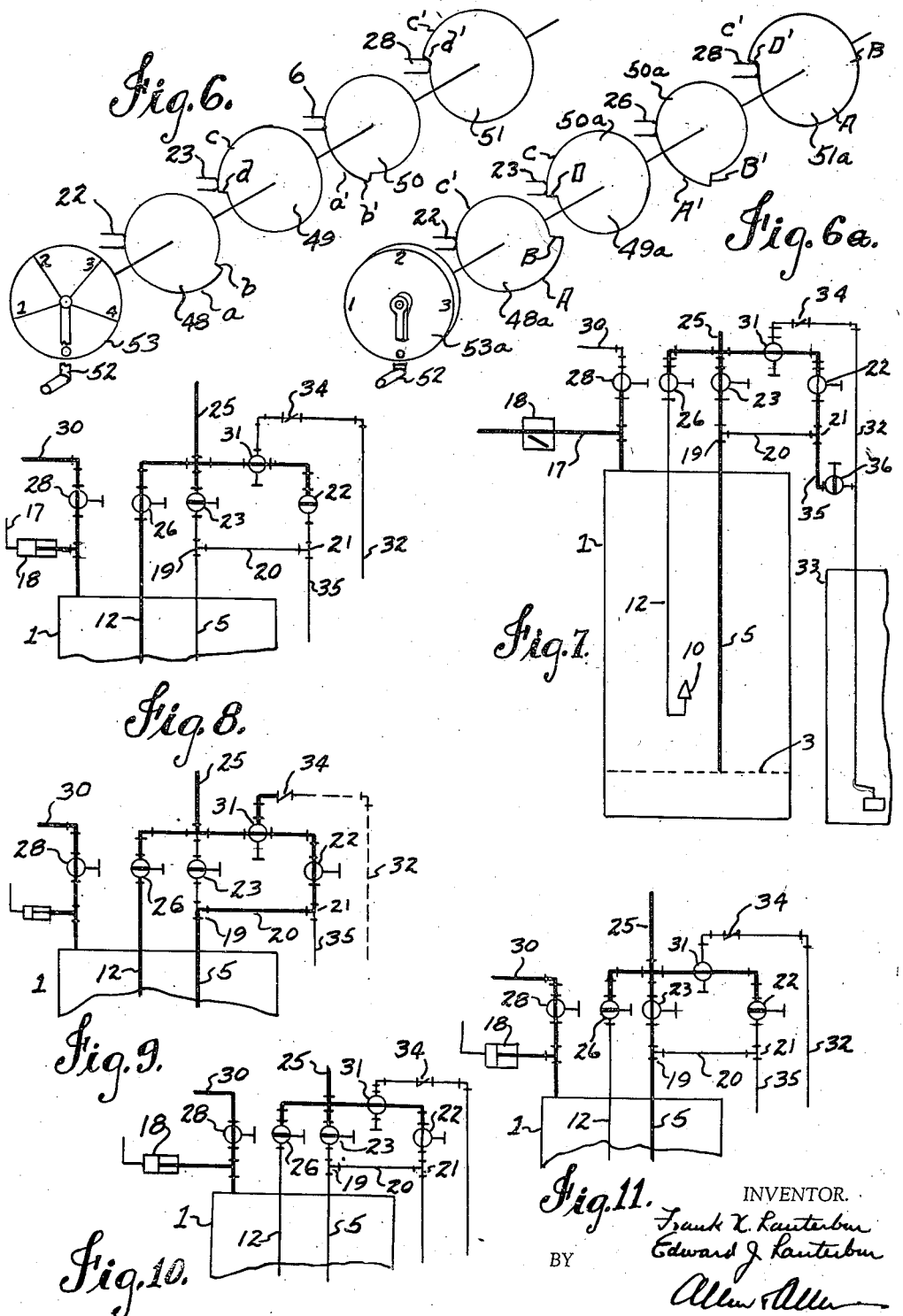

Patented May 26, 1936

2,042,178

UNITED STATES PATENT OFFICE 2,042,178

WATER-SOFTENER REGENERATING PROCESS AND APPARATUS

Frank X. Lauterbur and Edward J. Lauterbur, Sidney, Ohio; Wilhelmina S. Lauterbur and Leo V. Lauterbur, executors of said Frank X. Lauterbur, deceased Application August 18, 1932, Serial No. 629,335

13 Claims. (Cl. 210—24)

Our invention relates to water-softening processes and apparatus, and more especially to processes and apparatus employing base exchange silicates for softening the water, and in which the base exchange silicates are periodically revivified or regenerated by treating with an alkaline reagent, such as common salt.

In general, the object of our invention is to effect the regeneration thoroughly, with economy of materials and effort, and to provide simple, reliable and effective apparatus for carrying out the process of regeneration, as well as maintaining an efficient normal working condition of the softener between the periods of regeneration.

A particular object is to employ in a convenient and effective manner, the jet action for preparing the softening agent for thorough action of the regenerating material, such as the jet action disclosed and claimed in our co-pending application, Serial No. 354,622, filed April 12, 1929.

A further object is to introduce the regenerative material into association with the softening agent in an especially effective manner whereby there will be maximum intimacy of association and contact for complete reaction of the materials.

An optional object is to increase the thoroughness of regeneration by prolonging the association of the two materials, affording a soaking action.

A further particular object is to provide apparatus which will carry out the successive steps of the process as a result of simple manipulation in accordance with simple directions for manual operation, and which is adaptable to automatic operation, as for instance in conjunction with automatic controlling means such as disclosed and claimed in our prior Patent No. 1,804,834, issued May 12, 1931.

A further object is to employ an injector action in introducing the regenerative material, preferably by the force of water from the hard water supply mains; and preferably to provide for manipulation of this water pressure operation by simple means, and for simple, convenient and economical disposal of all waste flow, whether from this means, the jet, or the rinsing operation.

A preferred softening agent is zeolite, and we prefer to employ synthetic zeolite, for example having a specific gravity of approximately .8, which is readily suspended by agitation into a body of water over the normal bed of the material, and which attains an especially well distributed and open suspension under such action by a jet of water therethrough into water over the bed, with the normal water pressure relieved therefrom. Also, for the regenerative reagent we prefer to use an exceptionally strong brine of common salt, which, when forcibly injected into the body of suspension of the zeolite, intimately associates therewith due to the especially open distribution of the zeolite in suspension, allowing a quicker operation and more thorough regeneration. This is in distinction from slow infiltration of brine, by which method the concentration of the brine is not permitted to be very high, and the time of operation is necessarily governed by the rate of brine inflow. It is our present purpose to provide a scientifically correct method of regeneration which, due to its high efficiency, requires less salt but secures the desired action quickly and positively, with thorough cleansing of the filter bed of the softening apparatus and as nearly as possible complete rejuvenation or regeneration of the zeolite.

Our present apparatus makes it possible to employ a soaking step in our process, in which the commingled zeolite and brine remain in a quiescent state for a desired period of time. This is due to the forced action adapted to draw in a brine of very concentrated, almost crystalline consistency, which, owing to its high specific gravity and to the low specific gravity of the zeolite, will hold the zeolite in suspension without agitation.

We may employ this quiescent, soaking step in our process, or in a modification, dispense with it, introducing water immediately to rinse the zeolite immediately after cessation of brine inflow, in which case the brine concentration may be much lower.

A further object of our apparatus is to conveniently renew water to the brine supply, by simple means operated alternatively with the other uses of the water in our process.

Other objects will appear in the course of the following description, illustrated by the accompanying drawings, in which—

Fig. 2 is an elevation, looking to the left in Fig. 1, only the upper part of the brine tank being shown, and the lower part of the softener tank being in section to reveal the interior details thereof.

Fig. 3 is a partial vertical section on the line 3—3 of Fig. 2, to show a valve and one of its operating cams, on an enlarged scale.

Fig. 6 is a perspective diagram illustrating the relations of the cams to each other and to the valves, in the example employing the index as seen in Fig. 5.

Fig. 6a is a similar diagram illustrating these relations in the example employing the index of Figs. 1 and 5a.

Fig. 7 is a diagram illustrating the normal stage of operation of the softener.

Fig. 8 is a partial similar diagram illustrating the jet operation or roiling stage.

Fig. 9 is a similar diagram illustrating the brine injection stage.

Fig. 10 is a similar diagram illustrating the quiescent or soaking stage.

Fig. 11 is a similar diagram illustrating the rinsing stage.

In one example of our process, we shut off the hard water supply and open the waste outlet, thereby relieving the contained water and zeolite bed of the normal water pressure. We then open the hard water supply to a jet opening into the bed of zeolite. The apparatus contains a body of water over the zeolite bed, and the jet raises the disintegrated zeolite from its packed condition and carries it up into this body of water. The water displaced by the jet action escapes at the top through the waste outlet without carrying out the zeolite, which is light enough for suspension without actual flotation.

After such duration of this jet operation as will effect a thoroughly distributed suspension of the entire body of zeolite in the water, the jet is shut off. Then water is admitted from the hard water supply to the injector which acts through a connection with the brine tank to draw up the brine and inject it under the filter bed, to pass rapidly up therethrough and into the suspended zeolite, displacing the water of suspension and suspending the zeolite in the brine. The displaced water escapes through the waste outlet, including that displaced by the water from the injector action, which also is discharged into the tank below the filter bed through the pipe normally used for the hard water inlet. The injector then is stopped, and the associated zeolite and brine are left quiescent for such a period as is found to effect a thorough renewal of efficiency of the zeolite. Then the hard water inlet is opened, admitting the rinsing water, which carries the brine together with substances cleaned from the zeolite and from the filter bed, out through the waste outlet. When the rinsing has been completed, the waste outlet is closed, and the hard water inlet is left open, restoring the normal operating conditions. The soft water outlet has a check valve which closes toward the softener when the pressure is relieved in the softener, under the pressure of the soft water system, preventing back flow of the soft water when the waste outlet is open, and which opens as soon as normal pressure is restored with the waste outlet closed and the hard water inlet open.

In the modification of our process, the soaking stage is omitted; the rinsing inlet being opened as soon as the injector is stopped.

Figure 1:
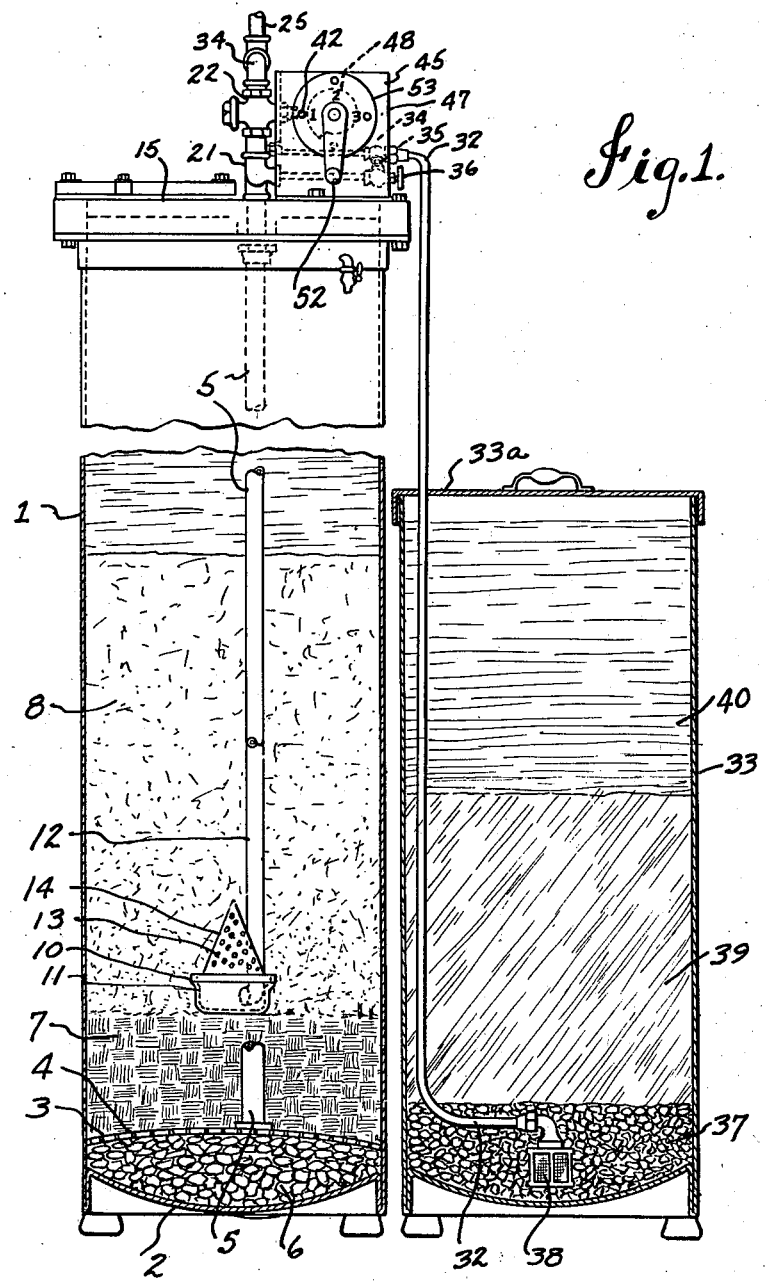
Figure 1 is an elevation, looking to the right in Fig. 2, the brine tank and the lower part of the softener tank being in section to reveal the interior details thereof.
Figure 4:
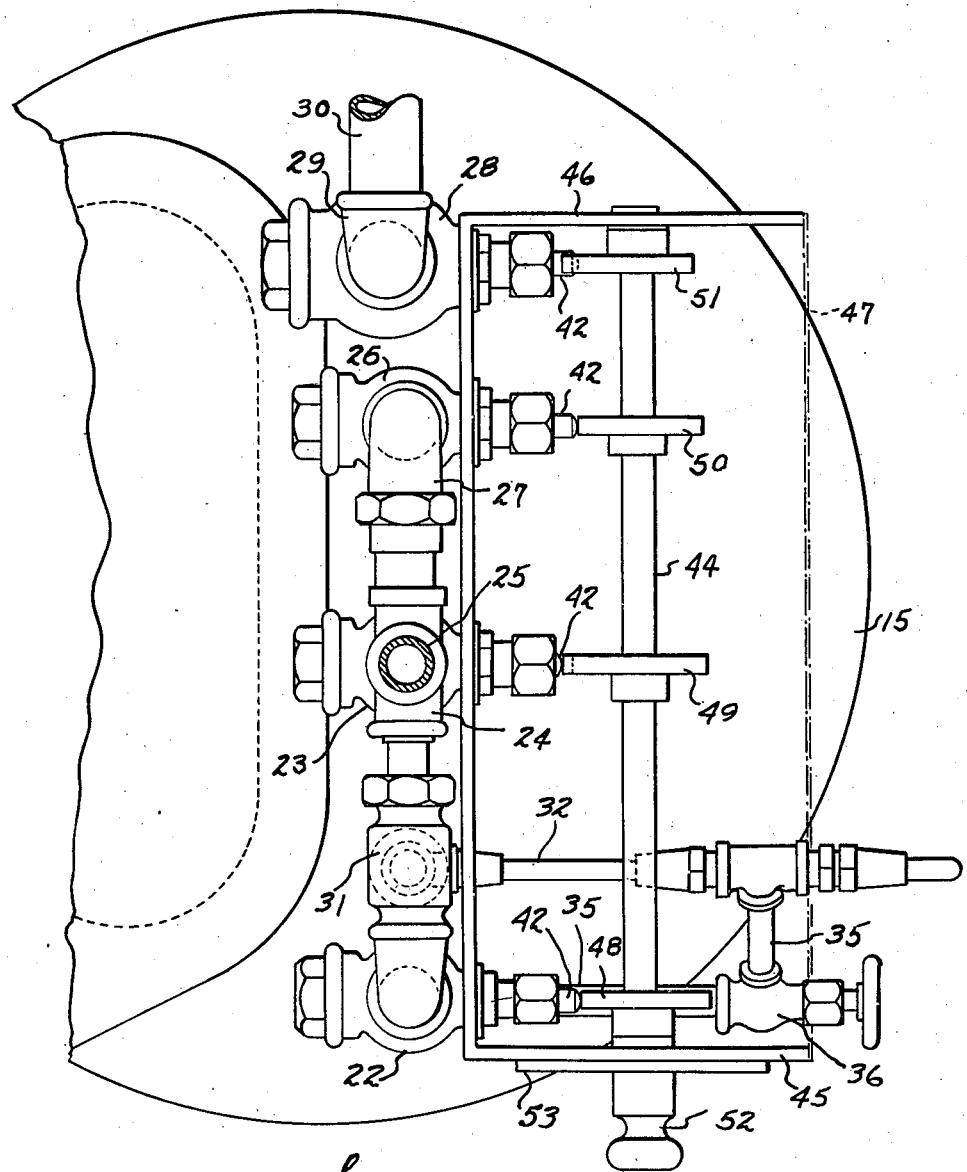
Fig. 4 is a partial plan view of the softener, on the same enlarged scale.

In our preferred apparatus which we illustrate for carrying out our process of the first example, the upright cylindrical tank 1 has, spaced up from its bottom 2, the distributor plate 3 having perforations 4 distributed throughout its area across the tank, and having opening down through it the hard water inlet pipe 5. A bed of material 6, preferably charcoal, is packed under the plate 3, and on its top is a bed 7 of gravel or the like. On top of this bed 7, the zeolite bed 8 rests in settled compact condition during normal operation, as seen in Fig. 1. Centrally of the tank, in the lower part of the zeolite bed, just above the gravel 7, is the jet head 10 with base casing 11 entered by jet inlet pipe 12, and a conical top 13 with radiating jet orifices 14 opening radially outwardly and upwardly into the zeolite bed 8.

The hard-water pipe 5 and the jet pipe 12 extend up through the head 15 of the tank 1, and a T fitting 16 opens through the head 15 and has the soft-water outlet pipe 17 extending from its side, with the check valve 18 therein. A T 19 on the end of the hard-water pipe 5 has leading from its side a nipple 20 entering an upturned elbow 21 having a side outlet and having connected to its top the injector-control valve 22. The hard-water control valve 23 is connected to the top of the T 19 and has connected to its top the cross fitting 24 with the hard-water supply pipe 25 entering its top. The jet-control valve 26 on the end of the jet pipe 12, is connected by the elbow 27 to the adjacent side of the cross fitting 24. The waste-control valve 28 is connected to the top of the T 16 of the soft-water pipe 17, and the elbow 29 leads from its top and connects to the waste pipe 30, understood to lead to a sewer or other waste disposal means.

To the opposite side of the cross fitting 24 is connected the injector 31, into the bottom of which leads the brine pipe 32 from the brine tank 33, through an upwardly opening check valve 34. An elbow connects the opposite end of the injector 31 with the top of the injector-control valve 22. The injector 31 and its connections as described constitute a by pass for hard water around the hard-water control valve 23 when this valve is closed and injector-control valve 22 is opened, so that the water rushing through the injector 31 draws the brine up through the brine pipe 32 and injects it into the tank 1, along with the water operating the injector, through pipe 5, to pass up into the water suspending the zeolite.

The brine pipe 32 has a T in it, from which the branch pipe 35 leads to the side of elbow 21 of the by pass, with a valve 36 which, when opened, with the hard-water inlet valve 23 open, admits water through brine pipe 32 to replenish the water in the brine tank 33, through the top of which the brine pipe 32 leads down into the gravel bed 37, where it has a strainer 38 on its end. The tank 33 contains the salt 39 above the bed 37, and above this the supply of water 40 to be drawn down through the salt 39 and the bed 37.

Each of the four valves 22, 23, 26 and 28 has its valve member 41 connected to a stem 42 projecting through one end of the valve body; the member 41 being yieldingly seated by a spring 43, as shown in Fig. 3. The cam shaft 44 is journaled horizontally in the ends 45 and 46 of box casing 47 mounted on top of tank head 15. Valve stems 42 extend into this casing 47, alined in the horizontal plane of the shaft axis. A series of cams 48, 49, 50 and 51 contact their peripheries with the ends of the stems of the valves 22, 23, 26 and 28, respectively. On the end part of shaft 44 extending past casing end 45 is fixed the manipulating crank handle 52 in front of the index plate 53 fixed on the end 45, with equally spaced graduations, marked 0, 1, 2, 3 and 4, respectively, in a series concentric with the shaft 44, and succeeding in clockwise direction.

As shown in Fig. 6, brine-valve control cam 48 and jet-valve control cam 50 are alike in shape, each with 288 deg. of concentric periphery and 72 deg. of volute rise $a$ and $a'$, respectively, to a drop $b$ and $b'$, respectively, of radial extent for opening and permitting closure of the respective valve. Jet cam 50 is set so that its rise $a'$ passes the valve stem in turning handle 52 from 0 to 1, opening jet valve 26, and brine cam 48 is set so that its rise $a$ passes the valve stem in the next move from 1 to 2 to open brine-control valve 22.

Water-inlet control cam 49 has 72 deg. of periphery concentric on a greater radius than 216 deg. of lesser radius, with rise $c$ of 72 deg. between the portions and a drop $d$ from one portion to the other, and is arranged so that drop $d$ passes the valve stem at inception of movement from 0 to 1, for closure of water-inlet valve 23, to remain closed until movement from 3 to 4 brings rise $c$ to open the valve, holding it open in movement from 4 to 0 by the portion of greater radius.

Waste-outlet control cam 51 has 288 deg. of periphery on the greater radius, with rise $c'$ from drop $d'$, of 72 deg. extent, and is arranged so that drop $d'$ has passed the valve stem as mark 0 is reached by handle 52, the rise $c'$ opening waste-valve 28 upon turning from 0 to 1 and the remaining concentric part holding the valve open throughout the remainder of turning until drop $d'$ allows it to close.

In Figs. 7 to 11, inclusive, heavy lines represent pipes through which there is flow, the brine flow to injector 31 being indicated by heavy dash lines in Fig. 9; and the heavy lines extend through the circles representing valves that are open. Thus, in Fig. 7, valve 23 and check valve 18 are open, and the other three valves 22, 26 and 28 are closed; this being the condition of the apparatus for normal water-softening operation. In Fig. 8, valves 26 and 28 are open, operating the jet 10 and relieving pressure and allowing escape of water displaced by the jet, through waste pipe 30; and valves 22 and 23 are closed, and check valve 18 is closed by the back pressure in soft-water pipe 17 due to relief in tank 1, preventing back flow of soft water to the tank. This is the condition for jet action and roiling of the zeolite. In Fig. 9, waste valve 28 and check valve 18 remain open and closed, respectively, jet valve 26 is closed, and injector-control valve 22 is open, with hard-water inlet valve 23 remaining closed, so that the hard water passes through the by pass around closed valve 23 and operates injector 31, drawing the brine through brine pipe 32 to pass from injector 31 through open valve 22, in the by pass, to the lower part of hard-water inlet pipe 5 to the bottom of the tank 1. The brine displaces the water in which the zeolite was suspended, the water escaping through waste pipe 30. In Fig. 10, all valves are closed except waste valve 28, and the brine with the zeolite suspended therein is quiescent; this being the soaking stage. In Fig. 11, waste valve 28 remains open and check valve 18 remains closed, jet valve 26 and injector-control valve 22 are closed, and water-inlet valve 23 is open, admitting hard water to rinse out the brine and impurities through waste pipe 30; this being the rinsing stage. Final turning of the index handle 52 to 0 from 4 restores the condition indicated in Fig. 7, resuming normal water-softening operation.

Figure 5:
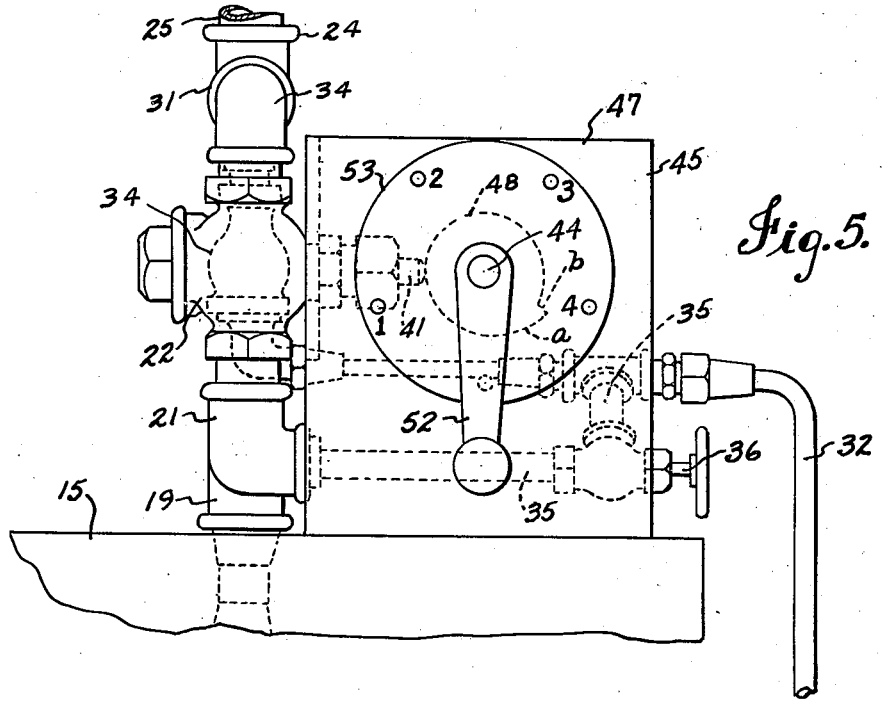
Fig. 5 is an elevation corresponding to the section in Fig. 3, showing the index.
Figure 5A:
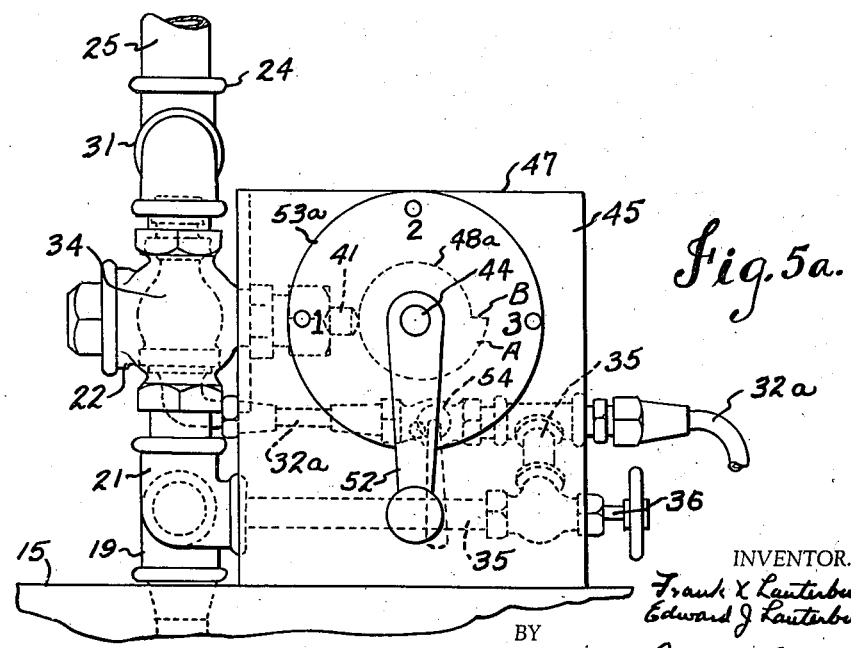
Fig. 5a is a similar view, showing a modified index.

The modified device, with the four-position index 53$a$ graduated 0, 1, 2 and 3, of Fig. 5$a$, omits the soaking stage indicated in Fig. 10; and its cam operation will be understood from Fig. 6$a$, where the peripheral divisions of the cams are 90 deg. in extent instead of 72 deg. as in Fig. 6, and cam 49$a$ differs from cam 49 in having only two instead of three successive arcs of action on the lesser radius before its volute rise reaches stem of hard-water inlet valve 23 for closing this valve; changing directly from the condition of Fig. 9 to the condition of Fig. 11. These cams are indicated as 48$a$, 49$a$, 50$a$ and 51$a$, corresponding to cams 48, 49, 50 and 51, respectively, of Fig. 6; their rises are indicated A, C, A' and C', and their drops B, D, B' and D', respectively.

In this modified device, as seen in Fig. 5$a$, we show a stop valve 54 which may be set to adjust the flow of brine under injector action, in brine pipe 32$a$ between its connection to injector 31 and its T connection to valve 36. In the first example we prefer to omit this valve, as the fullest possible freedom of flow of brine through brine pipe 32 is desired, to bring in brine of strong concentration and high specific gravity for holding the zeolite suspended in the quiescent or soaking stage of this example of the process. With such free passage, the injector 31 is powerful enough in its action to draw in brine almost crystalline in consistency, as before referred to, effectively suspending the light zeolite when quiescent, and acting quickly and effectively, due to its chemical strength, to regenerate and clean the zeolite.

It will be seen that, since the major part of the regeneration is effected with the brine not flowing, in this example of the process, there is economy of salt in addition to the shorter period of time required to effect thorough regeneration.

In either example, as the brine flows up through the beds 6 and 7 and the plate 3, all of these parts are cleansed, in addition to the action on the zeolite, as also is the lower part of the hard-water inlet pipe 5 by the inflow of brine therethrough. The construction of the apparatus is such that all passages are comparatively short and direct, not only allowing low cost of construction, but aiding in effective action in the several stages of the process. In hand setting of the valves, a minimum of care and attention of the operator is required; the directions needed being limited to specifying movement of handle 52 to the successive graduations, and the period of time it is to be left at each point, according to the conditions in each installation. The continuity of movement in one direction, of the cams, also makes it convenient to provide automatic operation thereof, as for instance by means disclosed in our prior patent hereinbefore mentioned.

What we claim as new and desire to secure by Letters Patent is:

1. The process of regenerating a disintegrated water-softening agent normally bedded in a body of water, with water circulating through said bed under pressure, comprising creating conditions in which the pressure is relieved and the circulation stopped, and successively, while maintaining said conditions, roiling said agent into said body of water, then commingling with the roiled agent a regenerating material, displacing the water, then rinsing said material from the agent, and then restoring said conditions, allowing the agent to settle.

2. The process of regenerating a disintegrated water-softening agent normally bedded in a body of water, with water circulating through said bed under pressure, comprising creating conditions in which the pressure is relieved and the circulation stopped, and successively, while maintaining said conditions, projecting a jet of fluid into said bed under said body, thereby roiling said agent into said body, then commingling with the roiled agent a regenerative material, displacing the water, then rinsing said material from the agent, and then restoring said conditions, allowing the agent to settle.

3. The process of regenerating a disintegrated water-softening agent normally bedded in a body of water with water circulating through the bed under pressure, comprising creating conditions in which the pressure is relieved and the circulation stopped, and successively, while maintaining said conditions, roiling said agent into said body, then commingling with the roiled agent a regenerative material, displacing the water, then allowing the body of commingled agent and regenerative material to remain quiescent for a substantial period of time, thereby soaking the agent in the regenerative material, then rinsing the material from the agent, and then restoring said conditions, allowing the agent to settle.

4. The process of regenerating a disintegrated water-softening agent comprising forcibly commingling with the agent a liquid regenerative material of substantially higher specific gravity than the agent, whereby the agent is suspended in the material, and leaving the commingled material and agent quiescent for a substantial period of time.

5. In water-softening apparatus, comprising a hard-water supply means and an enclosure having an inlet from said supply means, a jet inlet, a waste outlet and a soft-water outlet, and closure devices for the respective inlets and outlets, apparatus for regenerating the softening agent comprising means operative for admitting regenerative material to said enclosure, means closing the soft-water outlet when the waste outlet is open, and mechanism connected to the several closure devices having a cycle of actions closing the hard-water inlet and opening the jet inlet and waste outlet, then closing the jet inlet and allowing operation of the regenerative material admission means, then stopping said operation and opening the hard water inlet, and then closing the waste outlet, said soft-water outlet opening when the waste outlet is closed.

6. In water-softening apparatus comprising a hard-water supply means and an enclosure having an inlet from said means, a jet inlet, a waste outlet and a soft-water outlet, and closure devices for the respective inlets and outlets, apparatus for regenerating the softening agent comprising means operative by flow of water for admitting regenerative material to said enclosure, means closing the soft-water outlet when the waste outlet is open and opening said soft-water outlet when the waste outlet is closed, and mechanism connected to the several closure devices having a cycle of actions closing the hard-water inlet and opening the jet inlet and waste outlet, then closing the jet inlet and allowing flow of water from said hard-water supply means to the regenerative material admission means, then stopping said flow and opening the hard-water inlet, and then closing the waste outlet.

7. In water-softening apparatus comprising a hard-water supply means and an enclosure having an inlet from said supply means, a jet inlet, a waste outlet and a soft-water outlet, apparatus for regenerating the softening agent comprising means operative by flow of water therethrough for admitting regenerative material to said enclosure, means whereby the soft-water outlet is closed when the waste outlet is opened and opened when said waste outlet is closed, a conductor admitting the flow of water from the hard-water supply means through the regenerative material admission means, and valves controlling flow through the waste outlet, the jet inlet, the hard-water inlet and said conductor, respectively.

8. In water-softening apparatus comprising a hard-water supply means and an enclosure having an inlet from said supply means, a jet inlet, a waste outlet and a soft water outlet, apparatus for regenerating the softening agent comprising means whereby the soft-water outlet is closed when the waste outlet is opened and opened when the waste outlet is closed, valves controlling flow through the waste outlet, jet inlet and hard-water inlet, respectively, said hard-water inlet having a by pass around its valve, means in said by pass operated by flow of water therethrough to draw a regenerative material into said enclosure through said by pass, and a valve controlling the flow of water through said by pass.

9. In water-softening apparatus comprising a hard-water supply means and an enclosure having an inlet from said supply means, a jet inlet, a waste outlet and a soft-water outlet, and closure devices for the respective inlets and outlets, apparatus for regenerating the softening agent comprising means whereby the soft-water outlet is closed when the waste outlet is opened and opened when the waste outlet is closed, means operative for admitting regenerative material to said enclosure, and mechanism connected to the several closure devices having a cycle of actions closing the hard-water inlet and opening the jet inlet and waste outlet, then closing the jet inlet and allowing operation of the regenerative material admission means, then stopping said operation and opening the hard-water inlet, and then closing the waste outlet, said mechanism having in its cycle a period of delay between the stoppage of regenerative material admission and the opening of the hard-water inlet.

10. In water-softening apparatus comprising a hard-water supply means and an enclosure having an inlet from said supply means, a jet inlet, a waste outlet and a soft-water outlet, apparatus for regenerating the softening agent comprising means whereby the soft-water outlet is closed when the waste outlet is opened and opened when the waste outlet is closed, means operative for admitting regenerative material to said enclosure, and mechanism comprising controlling valves for the respective inlets and the waste outlet and means controlling operation of said regenerative material admission means and a device adapted for cyclic operation and having a series of cam surfaces in operative relation to the respective valves and said controlling means and movable in unison and so relatively arranged that, when moved, said device having the cam surfaces so arranged that it has a cycle of actions closing the hard-water inlet valve and opening the jet inlet and waste outlet valves, then closing the jet inlet valve and allowing operation of the regenerative material admission means, then stopping said operation and opening the hard-water inlet valve, and then closing the waste outlet valve.

11. In water-softening apparatus comprising a tank and a water-inlet pipe opening into the lower part of said tank, apparatus for regenerating the softening agent comprising a jet device in said tank above said pipe opening, a pipe leading to said jet device, a water-supply pipe connected to said water-inlet pipe and said jet pipe, said tank having a waste outlet and a soft-water outlet and means closing the soft-water outlet when the waste outlet is opened and opening the soft-water outlet when the waste outlet is closed, valves in the water-inlet pipe and the jet pipe and the waste outlet, respectively, a by pass from the water-supply pipe around the water-inlet valve and into the water inlet pipe, an injector and a valve in said by pass, and a brine pipe leading into said injector.

12. In water-softening apparatus comprising a tank and a water-supply pipe, extending into said tank, apparatus for regenerating the softening agent comprising a valve controlling flow through said pipe, a by pass around said valve, an injector and a valve in said by pass for controlling operation of said injector, a brine pipe leading into said injector, a branch pipe from said brine pipe into said water-inlet pipe, and a valve in said branch pipe.

13. In water-softening apparatus comprising a tank and a series of liquid-conducting connections entering said tank, apparatus for regenerating the softening agent comprising valves in the respective connections, a single set of cams connected for rotating in unison, a single one of said cams operatively related to respective one of the valves to open and close the valves according to a predetermined cycle upon rotation of the cams, means for manually rotating said cams, and index means for indicating the setting the cams at various stages of rotation in which various combinations of open and closed valves are established.

FRANK X. LAUTERBUR.
EDWARD J. LAUTERBUR.